United States Patent [19]
Weiland

[11] 3,751,761
[45] Aug. 14, 1973

[54] EVISCERATING TOOL

[76] Inventor: Richard J. Weiland, 217 Wahl Ave., Evans City, Pa.

[22] Filed: Aug. 3, 1972

[21] Appl. No.: 277,905

[52] U.S. Cl. ............................ 17/1 R, 17/11, 17/66, 128/304
[51] Int. Cl. .................................................. A22b
[58] Field of Search ........................ 17/1, 11 R, 66; 128/303 R, 304, 335, 315, 328, 2 B, 361

[56] References Cited
UNITED STATES PATENTS

| | | | |
|---|---|---|---|
| 2,471,088 | 5/1949 | Ayre | 128/304 |
| 3,315,661 | 4/1967 | Groat | 128/2 B |
| 2,533,445 | 12/1950 | Finney | 17/11 |
| 1,421,397 | 7/1922 | Bruck | 17/11 |

Primary Examiner—Louis G. Mancene
Assistant Examiner—D. L. Weinhold
Attorney—Buell, Blenko & Ziesenheim

[57] ABSTRACT

An eviscerating tool for removing the entrails of animals having an elongated body member with blunt edges and a handle portion at one end. At the other end, the tool has a plurality of lobes with blunt edges extending from both longitudinal blunt edges of the body member and forms acute angles with the body member in the direction opposite the handle. The body member has a curved tip portion at the end opposite the handle portion.

1 Claim, 1 Drawing Figure

PATENTED AUG 14 1973
3,751,761
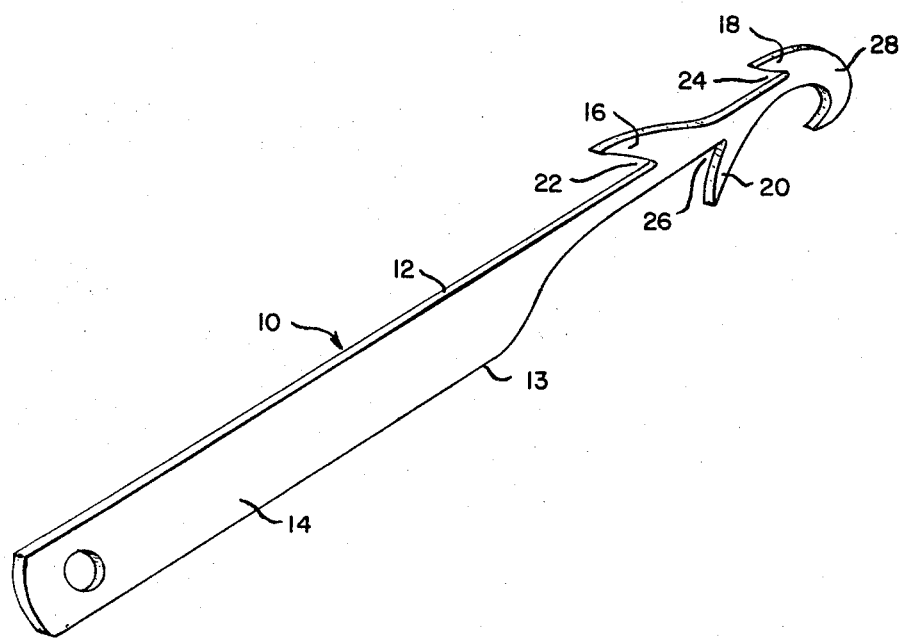

EVISCERATING TOOL

This invention relates to eviscerating tools for animals including fish, fowl and migratory game birds. Hunters in the field, immediately after killing game, must clean the animal in order to prevent rapid spoilage. If the intestines are not quickly removed, the meat will become deleteriously affected and will spoil. This is due to the fact that the digested food in the intestines quickly decays and this decay spreads rapidly. Undigested food in the gizzard or stomach spoils more slowly and may be left in the body until they can be removed at leisure. Previous types of tools employed knife-like edges which had a tendency to disfigure the game or to cut the entrails rather than pulling them and leaving them in tact thereby causing a spillage of blood on the hunter and spillage of digested food in the animal. Another problem with the existing eviscerating tools are their safety, particularly of younger hunters and also the expense of making a knife-like edge. The present invention avoids the knife-like cutting effect and yet its simplicity of design lends itself to an integral single unit piece of manufacture and avoids tight crevices which would collect bacteria from removal of entrails. In the present invention there are no close crevices for skin or meat or digested food to lodge.

I provide an eviscerating tool for removing the entrails of animals which comprises an elongated body member with blunt edges having a handle portion at one end and at the other end a plurality of lobes with blunt edges extending from both longitudinal blunt edges of the body member and forming acute angles with the body member in the direction of the handle and obtuse angles with the body member in a direction opposite the handle. The body member has a curved tip portion at the end opposite the handle portion.

Other details, objects and advantages of this invention will become apparent as the following description of the present preferred embodiment proceeds.

In the accompanying drawing, I have shown a present preferred embodiment of the invention in which:

The FIGURE is a perspective view of the eviscerating tool. The eviscerating tool in the figure shows an elongated body member 10 with flat blunt longitudinal edges 12 having a handle portion 14 at one end and at the other end a plurality of lobes 16, 18 and 20 all with flat blunt edges extending from both longitudinal edges 12 and 13 of the body member and forming acute angles 22, 24 and 26 with the body member in the direction of the handle 14 and obtuse angles with the body member 10 in a direction opposite the handle 14. The body member 10 has a curved tip portion 28 forming a lobe which permits easier insertion.

I claim:

1. An eviscerating tool for removing the entrails of animals which comprises an elongated body member with blunt edges having a handle portion at one end and at the other end a plurality of lobes with blunt edges extending from both longitudinal blunt edges of the body member and forming acute angles with the body member in the direction of the handle and obtuse angles with the body member in a direction opposite the handle, the body member having a curved tip portion at the end opposite the handle portion.

* * * * *

UNITED STATES PATENT OFFICE
CERTIFICATE OF CORRECTION

Patent No. 3,751,761   Dated August 14, 1973

Inventor(s) RICHARD J. WEILAND

It is certified that error appears in the above-identified patent and that said Letters Patent are hereby corrected as shown below:

In the Abstract, line 7, after "direction" should read --of the handle and obtuse angles with the body member in the direction --.

Signed and sealed this 1st day of January 1974.

(SEAL)
Attest:

EDWARD M. FLETCHER, JR.
Attesting Officer

RENE D. TEGTMEYER
Acting Commissioner of Patents